April 4, 1944.  C. H. GEMBERLING ET AL  2,345,804
FERTILIZER ATTACHMENT
Original Filed April 17, 1940  3 Sheets-Sheet 1
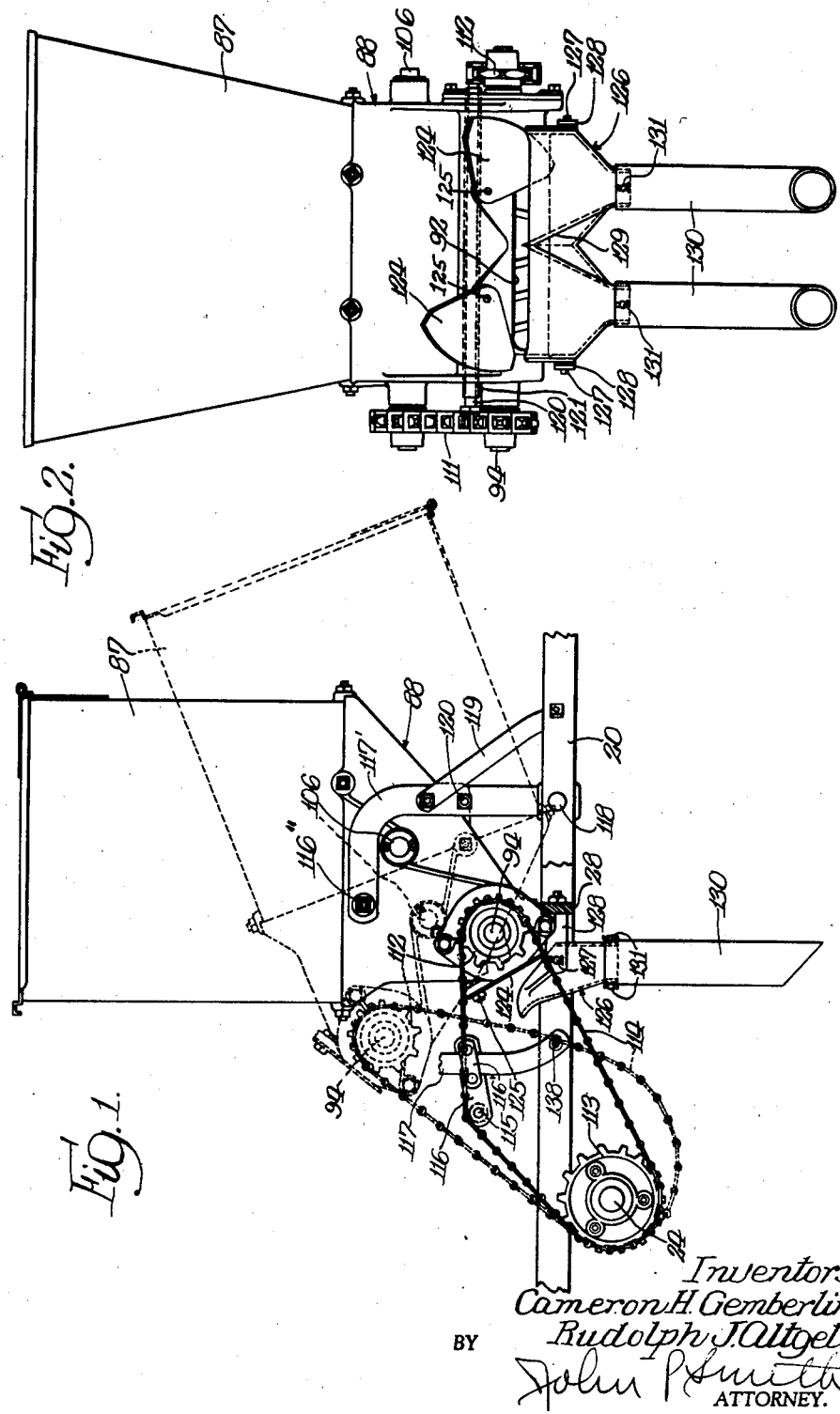

April 4, 1944.　　C. H. GEMBERLING ET AL　　2,345,804
FERTILIZER ATTACHMENT
Original Filed April 17, 1940　　3 Sheets-Sheet 2
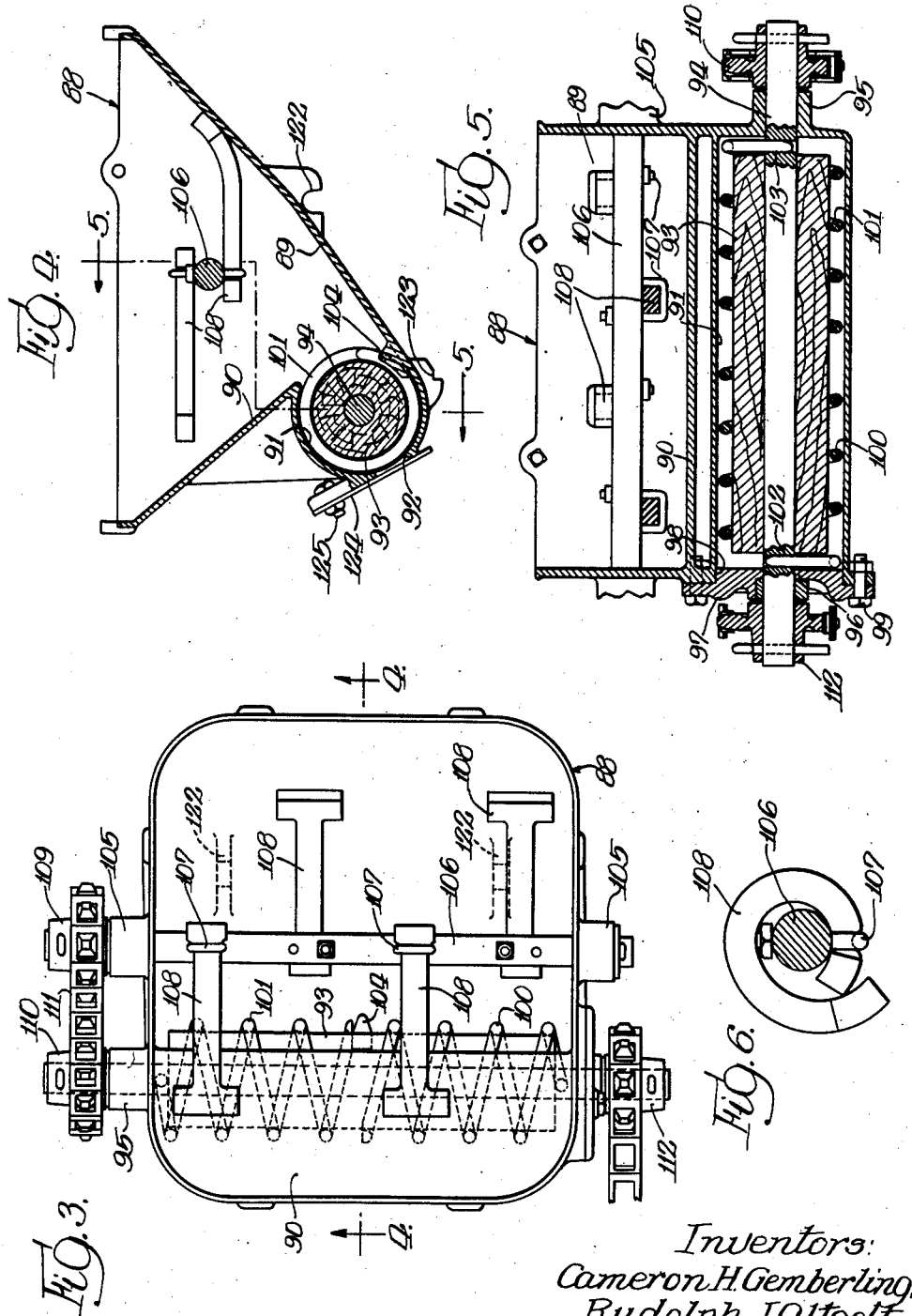
Inventors:
Cameron H. Gemberling,
Rudolph J. Altgelt,
BY John P. Smith
ATTORNEY.

April 4, 1944.  C. H. GEMBERLING ET AL  2,345,804
FERTILIZER ATTACHMENT
Original Filed April 17, 1940    3 Sheets-Sheet 3
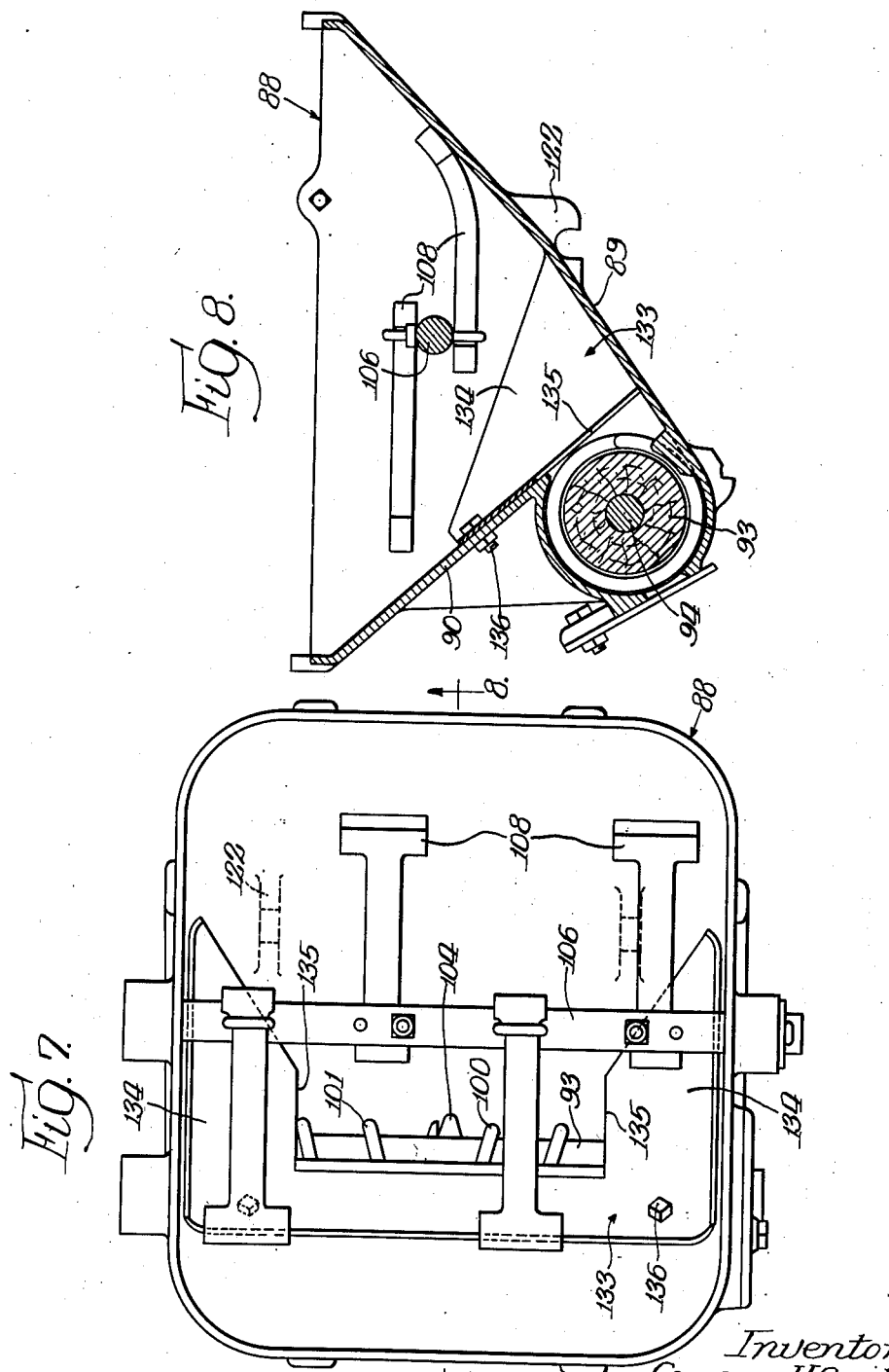
Inventors:
Cameron H. Gemberling
Rudolph J. Altgelt
BY John P. Smith
ATTORNEY Patented Apr. 4, 1944

2,345,804

UNITED STATES PATENT OFFICE 2,345,804

FERTILIZER ATTACHMENT

Cameron H. Gemberling and Rudolph J. Altgelt, South Bend, Ind., assignors to Oliver Farm Equipment Company, a corporation of Delaware Original application April 17, 1940, Serial No. 330,042. Divided and this application August 24, 1942, Serial No. 456,098

20 Claims. (Cl. 221—120)

The present invention is a division of our co-pending application Serial No. 330,042, filed April 17, 1940, on Potato planter.

The present invention relates generally to potato planters, but more particularly to a novel and improved construction of fertilizer attachment for a potato planter and the like.

The primary object of the present invention is to provide a novel and improved construction of a fertilizing attachment for a potato planter and the like.

A further object of the invention is to provide a novel and improved construction of a fertilizer container which is pivotally mounted on the implement frame so that the same can be tilted for removing the fertilizer therefrom without disconnecting the driving mechanism.

Another object of the invention is to provide a novel and improved construction of fertilizer attachment for potato planter or the like in which means are provided for depositing fertilizer in two equal strands, one on each side of the seed and in which adjustment is provided so as to permit the fertilizer to be deposited so that amounts arranging from one hundred pounds to three thousand pounds per acre may be uniformly distributed in accordance with the desire of the operator.

Another object of the invention is to provide a novel and improved fertilizer attachment for a potato planter or the like having means associated therewith for properly pulverizing the fertilizing material; means for preventing bridging of the material and means for properly feeding the fertilizer to the pulverizing and feeding mechanism.

These and other objects are accomplished by providing a construction and an arrangement of the various parts in the manner hereinafter described and particularly pointed out in the appended claims.

Referring to the drawings:

Fig. 1 is a side elevational view of our improved fertilizing attachment;

Fig. 2 is a rear elevational view of the same;

Fig. 3 is a top plan view of the fertilizing mechanism shown in Figs. 1 and 2;

Fig. 4 is a cross sectional view taken on the line 4—4 in Fig. 3;

Fig. 5 is a cross sectional view taken on the line 5—5 in Fig. 4;

Fig. 6 is an enlarged fragmentary cross sectional view showing the manner in which the rubber agitators are wound around the shaft when the hopper is filled with fertilizing material;

Fig. 7 is an enlarged top plan view of the fertilizer hopper showing the manner in which a shield may be inserted therein for reducing the amount of material discharged therefrom; and Fig. 8 is a cross sectional view taken on the line 8—8 in Fig. 7.

For the purposes of illustration, we have shown our improved fertilizer attachment in connection with a potato planter, the detailed description and drawings of which are more completely exhibited in our co-pending parent application hereinbefore referred to.

Our improved fertilizing attachment includes a metal container or hopper generally indicated by the reference character 87 which is attached to or secured to a container bottom or housing generally indicated by the reference character 88. The housing 88 is provided with forward and rearward converging walls 89 and 90, which terminate in substantially a semi-cylindrical recess 91. (See Figs. 3 to 5 inclusive.) Located in the rear side of the semi-cylindrical recess 91 of the housing 88 is a transverse fertilizer discharge opening 92 which extends substantially throughout the width of the fertilizer bottom or housing. Rotatably mounted in the semi-cylindrical recess 91 is a revolving, crushing, conveying and dispensing fertilizer mechanism which includes a wood roller 93 loosely mounted on a shaft 94. One end of the shaft 94 is journaled in a bearing 95 formed integrally with the housing 88. The other end of the shaft is journaled in a bearing 96 formed integrally with or carried by a removable plate 97 which, in turn, is secured to a complimentary recess 98 in the housing 88 by means of bolts 99. This removable plate permits the roller and shaft to be assembled before it is inserted in the cylindrical recess 91 of the housing 88. Embracing the periphery of the wood roller 93 are oppositely arranged coil springs 100 and 101. The outer ends of each of the springs extends beyond each end of the roller 93 and have their outermost ends bent radially inwardly so as to extend into apertures 102 and 103 respectively in the shaft 94. Located in the longitudinal center and on the inside inclined wall 89 of the bottom is an upwardly projecting lug 104 which has a forwardly pointed end and is located in the longitudinal center of the bottom 88. (See Figs. 3 and 4 of the drawings). This lug 104 is adapted to be alternately engaged by the inner ends of the opposite springs 100 and 101 upon each complete rotation of the roller and shaft 93 and 94 so as to alternately compress the springs 100 and 101. When the ends of the springs pass the lug, they will be abruptly expanded to loosen the fertilizer surrounding the roller between the coils of the springs. This construction prevents clogging and insures uniform feeding of the material. Located in the approximate center of the fertilizer housing 88 and journaled in suitable bearings 105 and the opposite sides thereof, is a rotatable agitator shaft 106. Secured to the opposite sides of the shaft by means of U-shaped bolts 107 and at spaced intervals throughout the length of the shaft, are oppositely arranged substantially T-shaped rubber agitators 108. Obviously with the construction thus far described and illustrated in Figs. 3 to 6 inclusive of the drawings, it will be observed that when the hopper 87 and housing 88 are filled with fertilizing material, the revolving of the shaft will cause the rubber agitators to assume the position shown in Fig. 6, but the moment there is a sufficient reduction in the amount of the fertilizer in the bottom 88, the rubber agitators 108 will become extended as shown in Figs. 3 and 4 of the drawings and prevent a bridging of the material in the bottom proper. These agitators will also perform the function of feeding the material to the crushing and feeding roller 93 and springs 100 and 101.

The shaft 106 is provided with a sprocket wheel 109 which is geared to a sprocket wheel 110 by means of a chain 111. The sprocket wheel 110 is secured to the shaft 94 at one end thereof. Secured to the other end of the shaft 94 is another sprocket wheel 112 which is geared to a drive sprocket 113 by means of a chain 114. The drive sprocket wheel 113 is loosely mounted on a drive axle 24 journaled on a frame member 70. For more detailed description of the frame and implement construction, see our co-pending application previously referred to. One lap of the chain 114 is adapted to travel on an idler roller 115 which is journaled on and adjustably supported by a bracket 116. The bracket 116 is adjustably supported by a vertical supporting frame member 117, which, in turn, is secured to one of the main frame members 116' as shown at 138. (See Fig. 1 of the drawings.) The fertilizer hopper 87 and bottom 88 are adapted to be swung from the full line position to the broken line position in Fig. 1 of the drawings for removing the fertilizer therefrom because it is often found necessary, in that commercial fertilizers contain acids which injure metals and often fertilizer, when standing, has a tendency to cake and forms a cement which locks the bearings of the moving parts. In order to permit the fertilizer bottom and container to be tilted forwardly, the bottom 88 is pivotally attached as shown at 116" to oppositely positioned and right angularly bent supporting members 117' which have their lower ends secured by bolts 118 to the opposite frame members 20. These members 117' are further reinforced and braced by diagonally disposed straps 119. The container 87 and bottom 88 are normally held in vertical position by a bolt 120 which extends through alined apertures in the opposite supporting members 117' and through a spacer pipe or sleeve 121. The rear inclined wall of the housing 88 is provided with downwardly projecting semi-circular slotted ears 122 which are adapted to engage the transverse pipe 121 for maintaining the bottom 88 and container 87 in its vertical position. (See Figs. 1, 2, 3 and 4 of the drawings.) The rear portion of the bottom 88 is also provided with centrally located notched ear 123 which is adapted to contact and rest upon a transverse frame member 28 for supporting a fertilizer hopper 87 in vertical position. (See Figs. 1 and 4 of the drawings.)

It will be obvious from the above description that should the operator desire to tip the hopper and its associated bottom forwardly to the dotted line position shown in Fig. 1 of the drawings, this may be accomplished by merely removing the bolt 120, without disconnecting the power drive or chain 114 from the driving sprocket wheel. It will also be obvious that the fertilizing attachment and particularly the operation of the moving parts, may be made inoperative by merely removing the drive chain 114.

In order to control the size of the opening 92 in the bottom 88 of the fertilizer, we have provided two oppositely disposed vanes or shutters 124 which are pivoted on their respective pivots or bolts 125. (See Figs. 1, 2 and 4 of the drawings). The adjustable shutters 124 as shown in Fig. 2 of the drawings are adjusted at different positions, but under normal operation they should be adjusted to the identical position so that an equal amount of fertilizing material will be discharged on each side of a central line of the longitudinal center of the opening 92 in the hopper bottom. In order to equally divide the ribbon of fertilizer material being discharged through the opening 92 to each of the distributing spouts so as to deposit the same behind the fertilizing openers (not shown), we have provided a spout or funnel receiving member, generally indicated by the reference character 126. This spout or funnel receiving member 126 is pivotally attached as shown at 127 to oppositely disposed brackets 128, which in turn are secured to the transverse frame member 28. (See Figs. 1 and 2 of the drawings.) This funnel-like member 126 is positioned below the discharge opening 92 of the bottom 88 so as to receive the fertilizer material therefrom. This member 126 is provided with an upwardly extending inverted V-shaped divider member 129, which performs the function of splitting or equally dividing the ribbon of fertilizer material being discharged into the two separate spouts or funnels. Connected to the spouts or funnels are pipes or conduits 130. The upper ends of these conduits are pivotally attached as shown at 131 to the respective spouts. The lower ends of the tubes 130 extend downwardly to convey the fertilizer to the desired earth working tools.

In order to effectively reduce or comminute the amount of material supposed to be discharged by or acted upon by the crushing and discharging roll of the fertilizer mechanism, we have provided a removable shield generally indicated by the reference character 133. (See Figs. 7 and 8 of the drawings.) The shield 133 is adapted to be placed in the bottom 88, so as to constrict the area of the roller 93 exposed to the fertilizer contained therein. The sides, as shown at 134, are inclined downwardly from the side walls to the bottom towards and in a direction of the roller so as to cover the end portion of the roller as shown at 135. With this arrangement, together with the adjustable shutters 124, the amount of fertilizer discharged per acre may be controlled from one hundred to four hundred pounds per acre. This shield 133 is preferably secured in place by a bolt 136.

Summarizing the advantages of our invention, it will be obvious that the fertilizer attachment herein described not only permits accuracy in the number of pounds per acre of fertilizer to be deposited, but also permits adjustments whereby the amount of fertilizer deposited may range from one hundred to three thousand pounds per acre in accordance with the requirements of the operator. As hereinbefore pointed out, the novel crushing and conveying rollers insure a breaking up of the caked fertilizer and affords a very efficient structure which may readily adapt itself to a variety of other planting mechanisms or machines other than potato planters.

While in the above specification we have described one embodiment which our invention may assume in practice, it will of course, be understood that the same is capable of modification and that modification may be made without departing from the spirit and scope of the invention as expressed in the following claims.

What we claim as our invention and desire to secure by Letters Patent is:

1. A fertilizer attachment for a planter comprising a housing having a fertilizer discharge opening therein, a roller journaled in said housing adjacent said opening, and relatively movable means carried by said roller for crushing and feeding said fertilizer through said opening.

2. A fertilizer attachment for a planter comprising a housing having a fertilizer discharge opening therein, a roller journaled in said housing adjacent said opening, means embracing the periphery of said roller, and means for agitating said first named means for crushing and conveying the fertilizer in said housing.

3. A fertilizer attachment for a planter comprising a housing having a fertilizer discharge opening therein, a roller journaled in said housing adjacent said opening, a spirally arranged member embracing said roller, and means carried by said housing and engageable with said member for crushing and conveying the fertilizer in said housing.

4. A fertilizer attachment for a planter comprising a housing having a fertilizer discharge opening therein, a roller journaled in said housing adjacent said opening, oppositely coiled springs embracing said roller, and means for actuating said springs for crushing and conveying the material in said housing.

5. A fertilizer attachment for a planter comprising a housing having a discharge opening therein, a roller journaled in said housing adjacent said opening, oppositely coiled springs mounted on said roller, and means mounted in said housing and adapted to engage the inner ends of said springs for compressing and abruptly releasing said springs.

6. A fertilizer attachment for a planter comprising a housing having a discharge opening therein, a roller journeled in said housing adjacent said opening, oppositely coiled springs mounted in said roller, and a lug mounted in said housing and adapted to engage the inner ends of said springs for compressing and abruptly releasing said springs.

7. A fertilizer attachment for a planter comprising a housing having an opening therein for discharging fertilizer therefrom, means mounted in said housing for discharging the fertilizer therefrom, a shaft journaled in said housing, and flexible members secured to said shaft for agitating the material in said housing.

8. A fertilizer attachment for a planter comprising a housing having an opening therein for discharging fertilizer therefrom, means mounted in said housing for discharging the fertilizer therefrom, a shaft journaled in said housing, and substantially radially projecting rubber arms secured to said shaft for agitating the material in said housing.

9. A fertilizer attachment for a planter comprising a housing having a fertilizer discharge opening therein, a roller journaled in said housing adjacent said opening, means embracing the periphery of said roller for crushing and conveying the fertilizer in said housing, plates pivoted to the opposite sides of said housing for controlling the size of said discharge opening, and a removable shield mounted in said housing for constricting the area of said roller exposed to the material contained in said housing.

10. A fertilizer attachment for a planter comprising a housing having an opening therein, a roller positioned adjacent said opening, means embracing said roller for conveying the material towards the center of said opening, plates pivoted to said housing for controlling the size of said opening, and a removable shield mounted in said housing for constricting the area of the roller exposed to the material contained in said housing.

11. A fertiluizer attachment for a planter comprising a housing having an opening therein, a roller positioned adjacent said opening, means embracing said roller for conveying the material towards the center of said opening, and a shield positioned in the bottom of said housing for constricting the area of the center of said roller exposed to the material in said housing.

12. A fertilizer attachment for a planter comprising a housing having an opening therein, a roller positioned adjacent said opening, means embracing said roller for conveying the material towards the center of said opening, and a removable shield mounted in the bottom of said housing and covering a portion of said roller for reducing the amount of material discharged through said opening.

13. A fertilizer attachment for a planter comprising a housing having a transverse elongated opening therein, a roller journaled in said housing adjacent said opening, oppositely coiled springs mounted on the periphery of said roller and having their inner ends terminating adjacent the center of said roller, and a lug carried by said housing and adapted to be engaged by the inner end of said springs for actuating said springs.

14. A fertilizer attachment for a planter comprising a housing having a transverse elongated opening therein, a roller journaled in said housing adjacent said opening, oppositely coiled springs mounted on the periphery of said roller and having their inner ends terminating adjacent the center of said roller, a lug carried by said housing and adapted to be engaged by the inner ends of said springs for actuating said springs, and a shield positioned in said housing for constricting the area of the roller exposed to the material in said housing.

15. The combination with an implement having a main frame, of a fertilizer attachment mounted on said main frame including a housing pivoted on said frame, there being a discharge opening in said housing, a feeding and crushing mechanism mounted in said housing, means for driving said feeding and crushing mechanism, and means whereby said housing and said feeding and crushing mechanism may be tilted on its pivot without disconnecting said driving mechanism.

16. The combination with an implement having a main frame, of a fertilizer attachment mounted on said main frame, said attachment including a hopper pivoted to said main frame, there being an opening in said hopper, a feeding and crushing roller journaled in said hopper adjacent said opening, means for driving said roller, and means whereby said hopper and said roller may be tilted without disconnecting said driving means from said roller.

17. A fertilizer attachment for a planter comprising a hopper having a fertilizer discharge opening therein, a roller journaled in said hopper adjacent said opening, means mounted on said roller for conveying the material towards the center thereof and means carried by said frame and located below the center of said opening for dividing the material discharged through said opening into two separate streams.

18. A fertilizer attachment for a planter comprising a hopper having a fertilizer discharge opening therein, a roller journaled in said hopper adjacent said opening, oppositely coiled springs mounted on said roller for crushing, conveying and discharging the material through said opening, and a divider positioned below the center of said opening for separating the material discharged into a plurality of streams.

19. A fertilizer attachment for a planter comprising a housing having a transverse elongated opening therein, a roller journaled in said housing adjacent said opening, oppositely coiled springs mounted on the periphery of said roller and having their inner ends terminating adjacent the center of said roller, a lug carried by said housing and adapted to be engaged by the inner end of said springs to actuate said springs, and a divider positioned below said opening for separating the material discharged into a plurality of streams.

20. A fertilizer attachment for a planter comprising a housing having a transverse elongated opening therein, a roller journaled in said housing adjacent said opening, oppositely coiled springs mounted on the periphery of said roller and having their inner ends terminating adjacent the center of said roller, a lug carried by said housing and adapted to be engaged by the inner ends of said springs to actuate said springs, a shield positioned in said housing for constricting the area of the roller exposed to the material in said housing, and a divider positioned below said opening for separating the material discharged into a plurality of streams.

CAMERON H. GEMBERLING.
RUDOLPH J. ALTGELT.